United States Patent

[11] 3,584,274

| [72] | Inventors | James T. Dimitrios<br>Glenview;<br>Sergio A. Alessio, Elmhurst, both of, Ill. |
|---|---|---|
| [21] | Appl. No. | 882,357 |
| [22] | Filed | Dec. 15, 1969 |
| [45] | Patented | June 8, 1971 |
| [73] | Assignee | The Bunker-Ramo Corporation<br>Broadview, Ill.<br>Continuation of application Ser. No.<br>568,658, July 28, 1966, now abandoned. |

[54] ELECTRICALLY PHASE LOCKED MOTOR
4 Claims, 3 Drawing Figs.

[52] U.S. Cl. .................................... 318/138,
318/132
[51] Int. Cl. .................................... H02k 29/00
[50] Field of Search .................................... 318/128-
—130, 132, 138, 254

[56]            References Cited
       UNITED STATES PATENTS

| 2,814,769 | 11/1957 | Williams | 318/138X |
| 2,986,684 | 5/1961 | Cluwen | 318/138 |
| 2,994,023 | 7/1961 | Devol | 318/138 |
| 2,995,690 | 8/1961 | Lemon | 318/138 |
| 3,134,220 | 5/1964 | Meisner | 318/138X |
| 3,229,178 | 1/1966 | Favre | 318/138 |

*Primary Examiner*—Oris L. Rader
*Assistant Examiner*—Gene Z. Rubinson
*Attorney*—Lowell F. Hammand ABSTRACT: The disclosure deals with an electromechanical device having a rotor with associated pickup and drive coils, with the signals induced on rotor rotation in the pickup coil being by an amplifier supplied at amplification to the drive coil. The device features frequency control by a high frequency source such as an oscillator of inherent high rate stability, with the high frequency being injected into the electric circuit of the device so that this circuit will operate at a frequency which is an invariable submultiple of the high frequency.

PATENTED JUN 8 1971 3,584,274
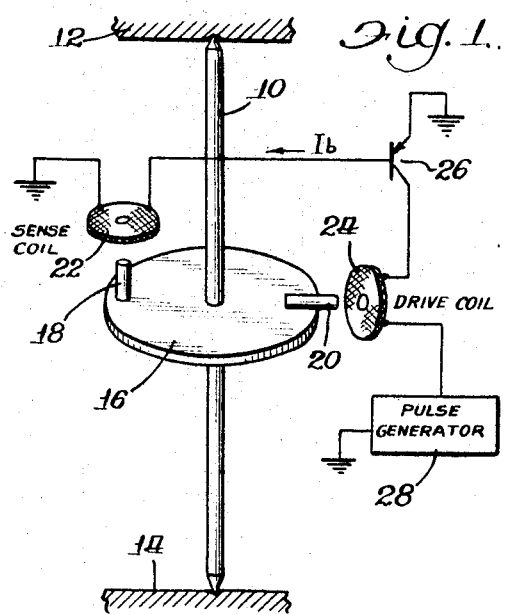
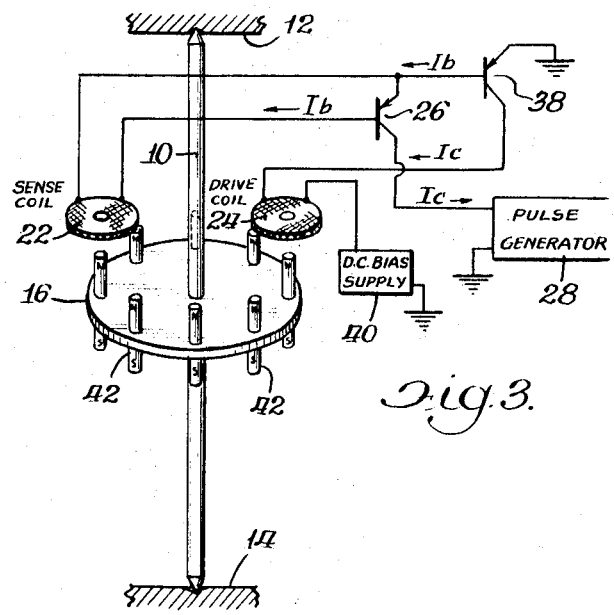
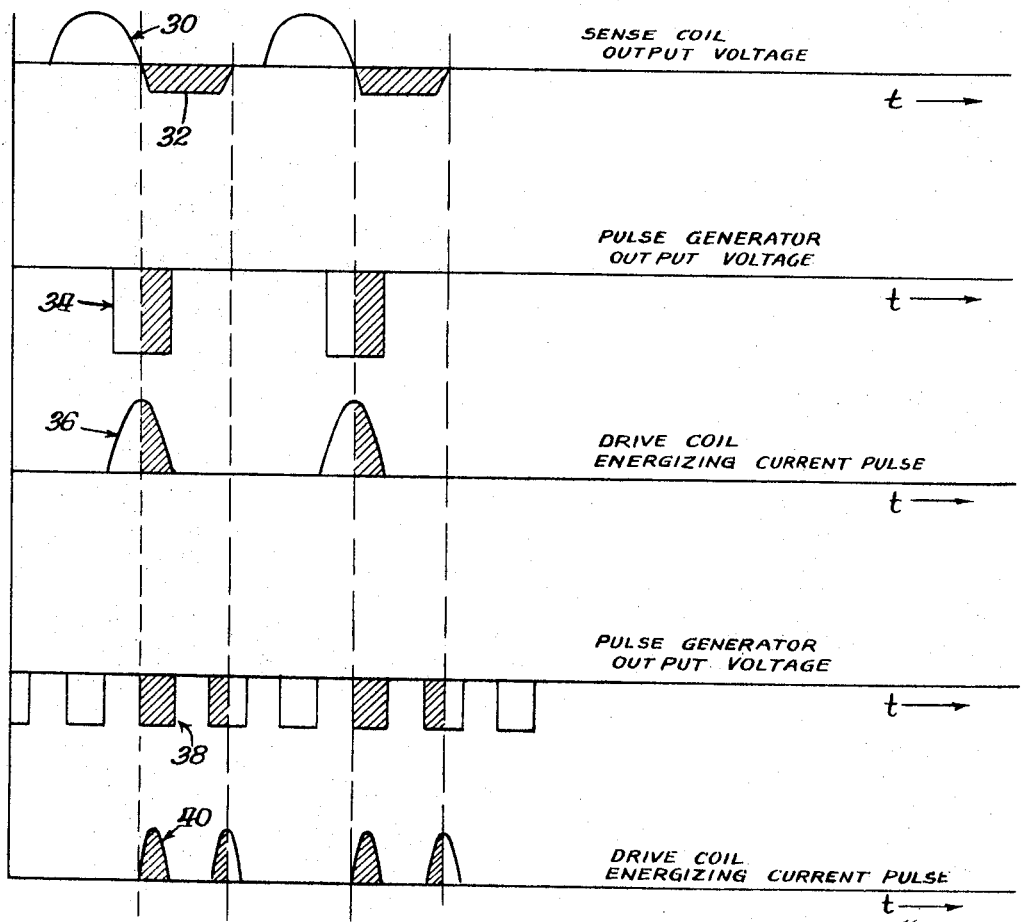
Inventors
James D. Dimitrios
Sergio A. Alessio
By L. F. Hammond, Atty.

ELECTRICALLY PHASE LOCKED MOTOR

This is a continuation of application Ser. No. 568,658, filed July 28, 1966, and now abandoned.

This invention relates to constant speed devices and more particularly to constant speed devices wherein a constant speed motor is phase locked to a driving signal whose frequency is a variable multiple of the motor speed.

In the automobile timekeeping art a need exists for a precise, constant low speed rotating device which is relatively inexpensive to produce and is insensitive to vibration. In the prior art an oscillator has been used to drive a synchronous motor to effect such a device. However, this system has two major disadvantages, cost and stability. The direct current power source of an automobile is converted by the oscillator to an alternating current form of driving power for the synchronous motor. A synchronous motor may be produced relatively inexpensively to operate on low frequencies such as 60 cycles per second. However, the oscillator required to produce a stable low frequency driving power from a direct current source is expensive. Conversely, an oscillator to produce a stable high frequency signal from a direct current source may be constructed relatively inexpensively. However, the synchronous motor therefor is expensive. Thus, both in low frequency operation and in high frequency operation the cost is prohibitive.

Accordingly it is one object of the present invention to provide a precise, constant low speed device which is relatively inexpensive to construct.

It is another object of the present invention to construct a precise, constant low speed device which is insensitive to vibration.

It is another object of the present invention to provide a precise, constant low speed device wherein a constant speed motor is phase locked to a driving signal whose frequency is a variable multiple of the motor speed.

It is a further object of the present invention to provide an electromechanical device of this type as a synchronous motor which is synchronized to a high frequency, but operates at a lower frequency at which the motor will generate the least noise, be subject to minimum wear and, hence, have a long useful life, be of small size, and require a minimum of speed reduction for many practical applications, such as a clock drive, for example.

Other objects of the present invention will become more apparent as the detailed description proceeds.

In general the present invention comprises rotatable shaft means with a pair of permanent magnets mounted diametrically opposite each other and mutually normal on said shaft means to rotate therewith. A drive coil is spatially mounted with respect to said magnets and magnetically coupled to one of said magnets to impart a rotative force thereto upon energizing of said drive coil. A sense coil is spatially mounted with respect to said magnets and magnetically coupled to the other of said magnets to generate a signal responsive to rotation of said shaft means. A pulse generator is provided having its output connected to the drive coil. A transistor is interconnected between the drive coil and sense coil to excite the drive coil responsive to the coincident output of the sense coil and the pulse generator wherefrom said shaft means is phase locked in rotation to the output of said pulse generator.

Further understanding of the present invention may best be obtained from consideration of the accompanying drawings wherein:

FIG. 1 is a schematic representation of a device constructed according to the present invention.

FIG. 2 is a wave form plot for operation of the device of FIG. 1.

FIG. 3 is a schematic representation of a preferred device constructed according to the present invention.

A shaft 10 is rotatably mounted between two supports 12 and 14. A disc 16 of nonmagnetic material is coaxially mounted on the shaft 10 to rotate therewith. Two permanent magnets 18 and 20 are mounted on the disc 16 180° apart and mutually normal.

A sense coil 22 is spatially mounted with respect to permanent magnet 18 and magnetically coupled thereto when permanent magnet 18 rotates past the coil 22. A drive coil 24 is spatially mounted with respect to permanent magnet 20 and magnetically coupled thereto upon excitation of the drive coil 24. One terminal of sense coil 22 is electrically grounded with the other terminal thereof being connected to the base of a PNP transistor 26. The emitter of transistor 26 is electrically grounded. The collector of transistor 26 is connected through drive coil 24 to one terminal of pulse generator 28. The other terminal of pulse generator 28 is electrically grounded.

A starting force is applied to the shaft 10 to cause rotation of the permanent magnets 18 and 20. As magnet 18 passes under sense coil 22, it induces therein an electrical pulse. The negative portion of the pulse induced in sense coil 22 causes the transistor 26 to assume a saturated condition whereby current is caused to flow through the drive coil 24 in the presence of a negative polarity output pulse from pulse generator 28. The current flowing through drive coil 24 generates a magnetic field which exerts a force on permanent magnet 20 to maintain rotation of shaft 10. It is to be noted that since the magnets 18 and 20 are mutually normal, there will be no magnetic interaction between magnet 20 and sense coil 22 and between magnet 18 and drive coil 24. The permanent magnets 18 and 20 of FIG. 1 effectively form a single-pole motor which, for a particular applied pulse frequency, phase locks thereto on a one to one speed basis. That is, for a 10 cycle pulse repetition rate, the shaft 10 will rotate at a speed of 10 revolutions per second.

Further understanding of the operation of the device of FIG. 1 may be obtained from consideration of the typical wave forms shown therefor in FIG. 2. Pulse 30 is representative of a typical pulse generated by the passage of permanent magnet 18 under sense coil 22. Application of the negative portion 32 of pulse 30 to the base of transistor 26 drives transistor 26 into a saturated condition. The pulse 34 is a typical negative polarity output pulse from the pulse generator 28 and pulse 36 is a typical current pulse generated upon coincidence of the output pulses from generator 28 and sense coil 22 to energize drive coil 24. The pulses 30, 34 and 36 are illustrative of the one to one relationship of the speed of shaft 10 and the output pulse frequency of pulse generator 28 with phase locking being effected at the midpoint of each pulse from generator 28.

The circuit as shown in FIG. 1 is a constant speed rotative device. As the load characteristics on shaft 10 change, the speed of rotation of shaft 10 also attempts to change. If the load is increased, the shaft 10 will tend to slow down. However, when this happens, the sense coil output voltage pulse 30 slips in phase so that the negative portion 32 thereof effects coincidence with pulse 34 at an earlier time, resulting in a greater effective portion of pulse 36 being applied to the drive coil 24. Thus, the energy applied to drive coil 24 from pulse 36 is increased and causes the motor to remain phase locked and maintain its speed constant under an increased load. If the load on the motor is decreased, the shaft 10 attempts to increase its speed of rotation. When this occurs, the output voltage pulse of sense coil 22 slips in phase so that the time of coincidence of the negative portion 32 with the output pulse of generator 28 occurs later and the effective amount of pulse 36 applied to the drive coil 24 is decreased. Thus, the rotative force from drive coil 24 applied to magnet 20 is decreased to maintain the speed of the motor constant with a decreasing load. It may therefore readily be appreciated that the apparatus in FIG. 1 is a constant speed device for varying load conditions.

Though the description heretofore has been for the device of FIG. 1 operating with a pulse generator output frequency equal to the rotative speed of shaft 10, the present invention is operable at pulse generator frequencies greater than the rotative speed of shaft 10. With the device of FIG. 1, phase lock conditions may be maintained with the shaft at a constant speed while the frequency of pulse generator 28 is operated at a multiple thereof. Thus, the aforementioned 10 revolutions per second of shaft 10 may be maintained in a phase lock condition while the pulse generator 28 operates at a greater repetition rate, for example, 20, 30 or 50 pulses per second.

This constant speed at multiple driving frequencies may be further appreciated by again considering the pulse wave forms shown in FIG. 2. As explained previously, the pulses 34 and 36 are for a one to one shaft speed-pulse relationship. Pulses 38 and 40 are illustrative of a pulse generator output frequency three times the rate of shaft 10. As shown, during the occurrence of the negative portion 32 of output pulse 30 from sense coil 22, slightly less than two pulses from pulse generator 28 are coincident therewith to produce slightly less than two pulses 40 applied to the drive coil 24. For maintenance of the phase locked condition for the motor it is necessary that the energy of the driving current pulses 40 equal the energy of the driving current pulse 36. To effect this, the width and the height of the output pulses 38 from pulse generator 28 are adjusted. This insures that the same amount of force will be applied to the driven magnet 20 and that the rotative device of FIG. 2 will maintain the same shaft rotating speed.

Turning to FIG. 3, a preferred embodiment for the practice of the present invention is illustrated. The embodiment of FIG. 3 effectively isolates the drive coil 24 from the pulse generator 28 to give an improved performance therefor.

In FIG. 3, one side of the sense coil 22 is connected to the base of a PNP transistor 26. The other side of sense coil 22 is connected to the emitter of transistor 26. The collector of transistor 26 is connected to one output terminal of pulse generator 28, the other output terminal of pulse generator 28 being electrically grounded. A second PNP transistor 38 has its emitter electrically grounded and its base connected to the emitter of transistor 26. The collector of transistor 38 is connected through drive coil 24 to a direct current negative bias supply 40.

The shaft 10, as for the device of FIG. 1, has a nonmagnetic disc 16 coaxially mounted thereon to rotate therewith. A plurality of permanent magnets 42 are mounted about the periphery of the disc 16 so that the poles thereof are like oriented. The sense coil 22 and drive coil 24 are spatially positioned with respect to each other and to magnets 42 so that as one of the magnets 42 is passing under sense coil 22 and inducing a voltage therein, another of the magnets 42 is passing under drive coil 24 and being magnetically coupled thereto to accept a rotative driving force therefrom.

In operation, the sense coil 22 of FIG. 3 has induced therein an electrical pulse upon the passage thereunder of one of the permanent magnets 42. This pulse saturates the transistor 26 permitting, upon coincidence with an output pulse from pulse generator 28, a collector current flow. Saturation of transistor 26 causes saturation of transistor 38 giving a pulsed collector current flow through the drive coil 24 to magnetically couple the drive coil 24 to one of the magnets 42 thereunder and impart a rotative driving force thereto.

The theory of phase lock operation for the device of FIG. 3 is the same as for the device of FIG. 1. The multiplicity of poles in the disc 10 will, of course, provide a further reduction in the generator frequency to shaft speed relationship. It is to be noted that though the foregoing embodiments have utilized negative pulse outputs from generator 28 and a negative direct current bias source, that such may be replaced with positive polarity pulses and bias sources with the substitution of NPN transistors.

The embodiment of FIG. 3 was constructed to phase lock with a 100 pulses per second output from generator 28 on a one to one basis. That is, the speed of shaft 10 was such that 100 pulses per second were generated by the magnets 40 passing under sense coil 22. The actual speed of shaft 10 was 100/8 (eight magnets 42 were used) or 12.5 revolutions per second. The output frequency of the generator 28 was changed to 1000 pulses per second and, with the width and height of the output pulses adjusted as described heretofore, the shaft 10 remained phase locked at the speed of 12.5 revolutions per second.

Persons skilled in the art will, of course, readily adapt the teachings of the present invention to embodiments far different than the embodiments described and illustrated above. Accordingly the scope of protection afforded the present invention should be limited only in accordance with the appended claims.

We claim:

1. A constant speed device comprising rotatably mounted permanent magnet means, a drive coil spatially mounted with respect to said magnet means and magnetically coupled thereto to impart a rotative force to said magnet means upon energizing said drive coil, a sense coil spatially mounted with respect to said magnet means and magnetically coupled thereto to generate a signal responsive to rotation of said magnet means, a pulse generator a gating means responsive to the output of said sense coil and the output of said pulse generator to energize said drive coil, wherein said rotatably mounted permanent magnet means comprise rotatable shaft means, and a pair of permanent magnets mounted diametrically opposite each other and mutually normal on said shaft means to rotate therewith, and wherein said sense and drive coils are each mounted to magnetically couple with an associated one of said permanent magnets.

2. A constant speed device comprising a rotatable shaft, a nonmagnetic disc coaxially mounted on said shaft to rotate therewith, a plurality of permanent magnets mounted around the periphery of said disc and having the poles thereof like oriented, a drive coil mounted adjacent said magnets to magnetically couple upon excitation thereof with one of said magnets and impart a driving force thereto, a sense coil mounted adjacent said magnets to magnetically couple upon rotation of said shaft with each of said magnets and generate a pulse therefor, a pulse generator, and transistor gating means responsive to the output of said sense coil and the output of said pulse generator to energize said drive coil, wherein said gating means comprise a first transistor having the collector thereof connected to one terminal of said pulse generator, the base thereof connected to one terminal of said sense coil, and the emitter thereof connected to the other terminal of said sense coil; DC bias means; and a second transistor having the emitter thereof grounded and connected to the other terminal of said pulse generator; the base thereof connected to the emitter of said first transistor, and the collector thereof connected through said drive coil to said DC bias means.

3. In an electromechanical device, in combination; a rotor having magnetic poles, with a sense coil cooperating with the rotor poles, and a drive coil also cooperating with the rotor poles, an amplifier, means electrically connecting said sense coil with said amplifier to supply an input signal thereto as the rotor rotates, and means to supply said driving coil with the output of said amplifier to supply driving impulses to said rotor, with said rotor motion acting to induce pulsating input signals into said sense coil, and other means separate from said amplifier for supplying to said amplifier a continuous, uninterrupted series of pulsating signals of a constant control frequency being a multiple of the frequency of said induced input signals which by the rotor action of the motor is divided to provide said driving impulses at a submultiple of said control frequency.

4. In an electronically phase-locked timekeeping device, in combination, a pivoted armature having at least two magnetic armature poles spaced apart from each other; a first magnetic field circuit adjacent a portion of the armature including a sense coil cooperating with at least one of said armature poles; a second magnetic field circuit associated with the armature but separate from and spaced apart from the aforesaid first magnetic field circuit including a drive coil other than said sense coil and cooperating with at least one armature pole other than the first mentioned of said armature poles; electrical armature-actuating circuitry for connection between said sense coil and said drive coil including an amplifier; means electrically connecting said sense coil with said armature-activating circuitry to supply input signals to said amplifier in response to movement of the armature; means to supply said drive coil with output signals from said amplifier to induce magnetic impulses into said second magnetic circuit and impart motion to said armature, with said armature motion acting to induce pulsating input signals into said sense coil; and other separate means supplying the armature-actuating circuitry with a continuous uninterrupted series of pulsating electric control signals of constant frequency at a multiply of the frequency of said induced pulsating input signals whereby motion of the armature will be at speed corresponding to a submultiple of said multiple frequency and cause said electrical armature-actuating circuitry to pulse the aforesaid drive coil at a fraction of the frequency rate of said control signals, but controlled thereby and in phase-locked relation therewith.